No. 641,725. Patented Jan. 23, 1900.
F. M. PETERS.
CRACKER OR BISCUIT MACHINE.
(Application filed Aug. 26, 1899.)

(No Model.) 3 Sheets—Sheet 1.

Witnesses Inventor,
Frank M. Peters,
By Offield, Towle & Linthicum,
Attys.

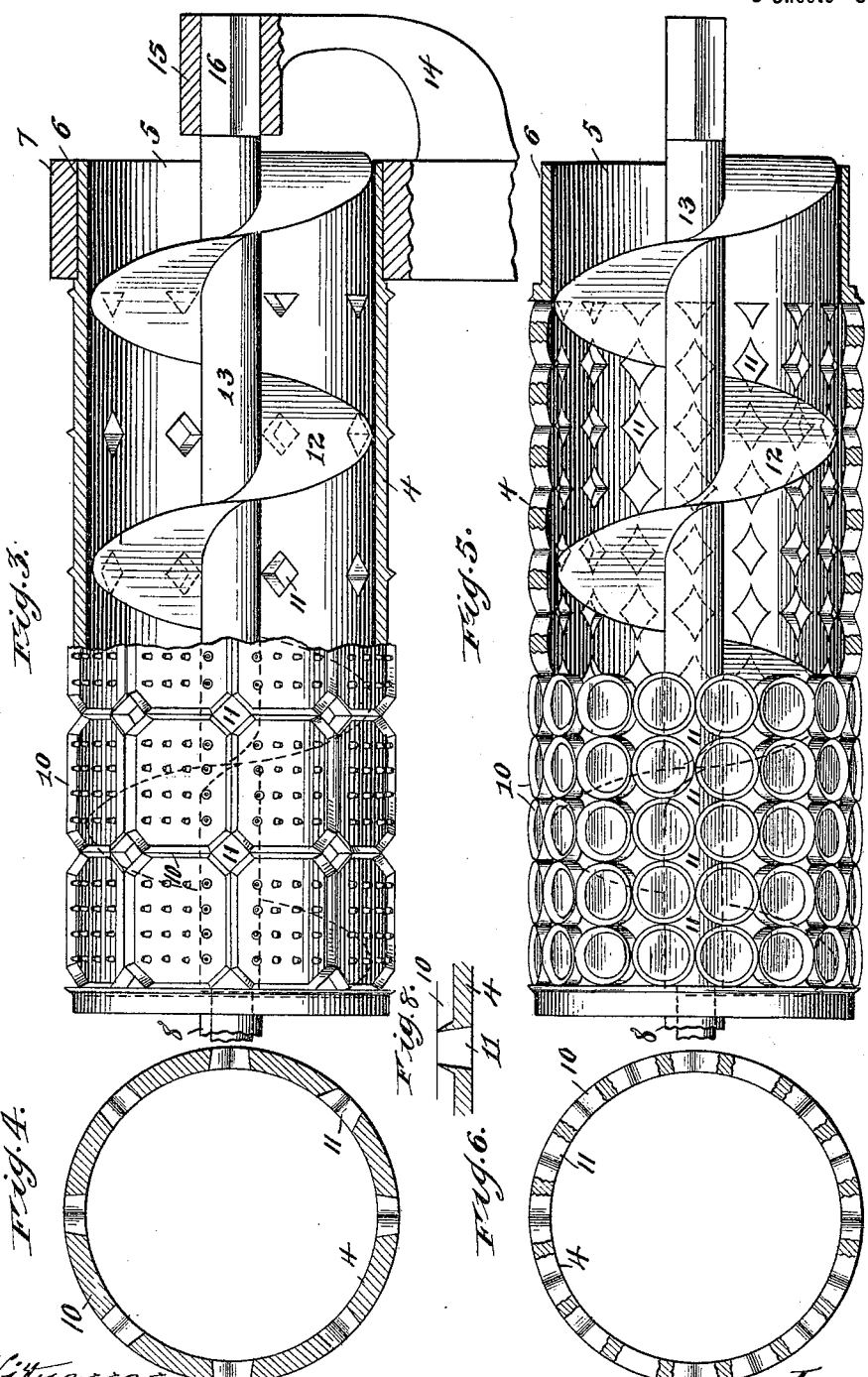

UNITED STATES PATENT OFFICE.

FRANK M. PETERS, OF CHICAGO, ILLINOIS.

CRACKER OR BISCUIT MACHINE.

SPECIFICATION forming part of Letters Patent No. 641,725, dated January 23, 1900.

Application filed August 26, 1899. Serial No. 728,543. (No model.)

*To all whom it may concern:*

Be it known that I, FRANK M. PETERS, a citizen of the United States, residing in the city of Chicago, in the county of Cook and State of Illinois, have invented certain new and useful Improvements in Cracker or Biscuit Machines, of which the following is a specification.

This invention relates to machines for cutting or molding crackers or biscuit from dough and is in the nature of an improvement upon the machine set forth in an application for Letters Patent filed by me July 11, 1898, Serial No. 685,698. In my said prior application a cutter of the rotary type is set forth, together with suitable stripping mechanism, for removing the cut or molded dough. The type of cutter there shown is a cylindrical one, and the arrangement of the cutters on the cylinder is such that all of the dough is cut into crackers and stripped from the exterior of the cylinder, there being no part thereof which becomes scrap, owing to the particular conformation of the crackers being cut, by reason of which there is no waste of the sheet of dough operated upon.

My present invention has for its object to provide a rotary cutter adapted for use in the cutting of crackers or biscuit of such a form that those portions of the dough which lie between the crackers or biscuit become waste or "scrap," so called, and must be disposed of otherwise than those portions of the dough which are intended to form the crackers.

A further object of my invention is to provide a rotary cutter of this type which shall be particularly organized to coöperate with a revolving air-suction device for stripping and carrying away the dough, such as is set forth in my prior application hereinbefore referred to.

To this and other ends my invention consists in certain novel features, which I will now proceed to describe and will then particularly point out in the claims.

Figure 1:
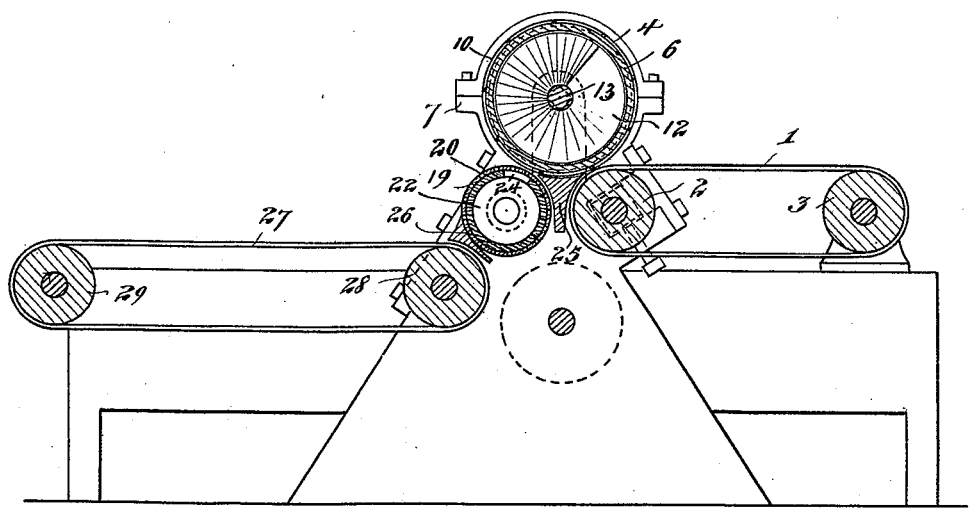
Figure 2:
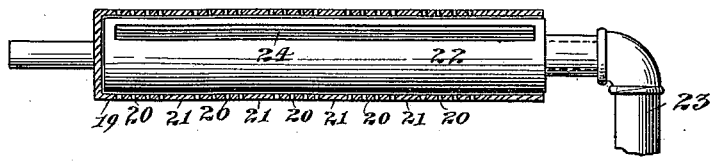
Figure 7:
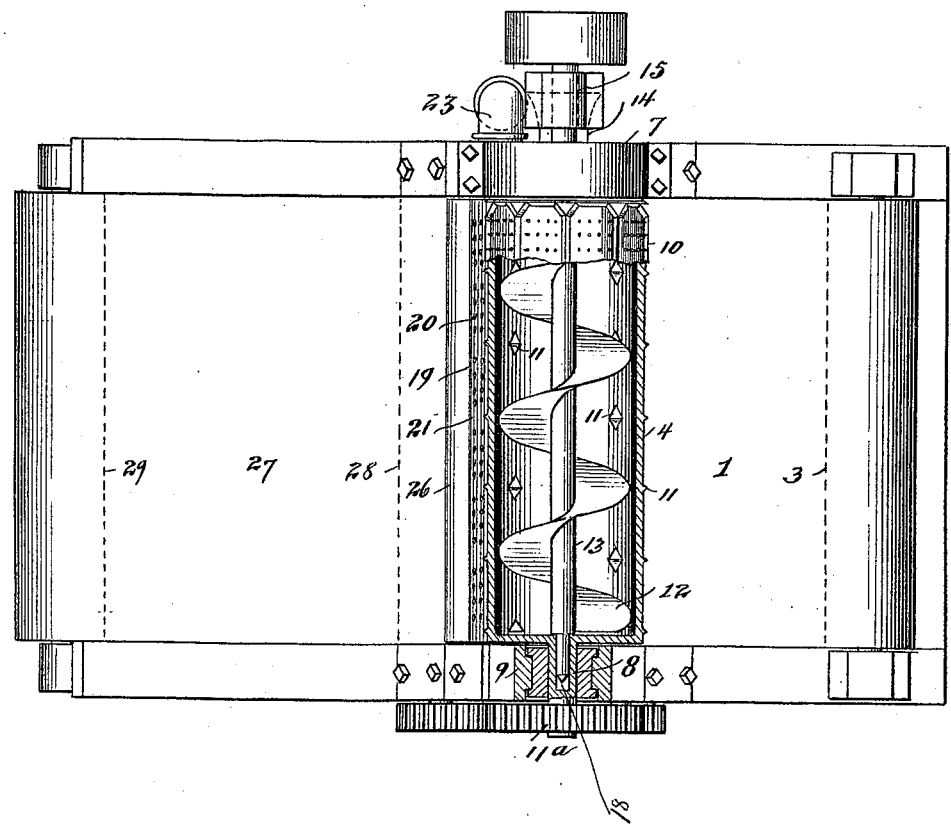

In the accompanying drawings, Figure 1 is a vertical sectional view of a machine embodying my invention in one form. Fig. 2 is a detailed view, partly in section, of exhaust stripping device. Fig. 3 is an elevation, partly in section, of a rotary cutter embodying my invention. Fig. 4 is a transverse sectional view of the same. Fig. 5 is a view similar to Fig. 3, illustrating another form of the cutter. Fig. 6 is a transverse sectional view of the cutter shown in Fig. 5. Fig. 7 is a plan view of the apparatus, partly in section; and Fig. 8 is an enlarged detailed sectional view through a portion of the cutting-cylinder, showing one of the apertures through which the scrap passes to the interior.

The machine shown in Fig. 1 is substantially identical in its general features of construction with that set forth in my prior application, hereinbefore referred to. It comprises an endless belt or apron 1, passing around rollers 2 and 3 and serving to carry the dough to the cutting-cylinder 4. It is to the construction of this cylinder that my invention more particularly relates. The cutting-cylinder 4 is hollow and is mounted to revolve in suitable bearings, as indicated more particularly in Figs. 1, 3, and 7 of the drawings.

The cutting-cylinder is open at one end, as indicated at 5, the opening being substantially of the full interior width of the cylinder, and the body of the cylinder at this end is formed externally into a bearing surface or journal 6, which fits within a suitably-divided bearing or box 7. At its other end the cutting-cylinder is closed and is provided with an extended journal 8, which fits within a divided bearing or box 9, so that the cutting-cylinder may be readily removed and replaced. The machine is thus adapted to receive any one of a number of cylinders having different patterns and sizes of cutters thereon. In Fig. 3 I have shown a cylinder adapted for cutting biscuit which are octagonal in form, while in Fig. 5 I have shown a cutting-cylinder adapted for cutting round biscuit or wafers. In each case the cutters proper consist of a radially-projecting knife-edge 10, having the form of the outline of the cracker or biscuit to be cut, and in the case of the crackers having straight sides, as in Fig. 3, one portion or section of each knife-edge is common to two adjacent molds or cutters. Between each group of four cutters is an aperture 11, extending entirely through the wall of the cylinder, so that the scrap or waste may pass through said apertures into the interior of the cylinder. In order to provide for an easy clearance of these scrap-apertures, they are preferably made of increasing diameter inward, although they may be made of one diameter throughout and yet be operative. It results from this construction that those portions of the knife-edges 10 which border or surround the apertures 11 are either straight as to those sides which are adjacent to the apertures or else slightly inclined away from each other in the direction of the axis of the cutting-cylinder. It will be readily understood that as the cutting-cylinder revolves the cutters will cut out the biscuit in the desired shape against the solid or imperforate portions of the cylinder, while the remaining portion of the dough, which constitutes the scrap, will pass through the apertures 11 into the interior of the cylinder.

The cutting-cylinder may be driven in any suitable manner—as, for instance, by means of a gear 11$^a$, secured on the journal 8 and driven by a train of gearing, as in my prior application, hereinbefore specified, or in any suitable manner.

In order to provide for the removal of the scrap from the interior of the cylinder as it accumulates therein, I employ a spiral conveyer 12, the shaft 13 of which is supported so as to prevent rotation and is coincident with the axis of rotation of the cylinder. This shaft is preferably supported at one end by means of a bracket 14, extending upward from the fixed lower portion of the bearing 7 and having a polygonal sleeve 15, in which the similarly-shaped end 16 of the shaft 13 fits. The other end of the shaft 13 extends into a recess 18 in the journal 8 and is supported therein without rotating along with said journal. It will be seen that as the cylinder rotates, the spiral conveyer being fixed, the mass of dough which has entered the interior of the cylinder in the form of scrap through the apertures 11 will be fed by the spiral conveyer to the open end 5 of the cutting-cylinder and there discharged.

In conjunction with the cutting-cylinder thus constructed I employ a stripping mechanism, consisting of an air-suction device constructed as to its general features in the manner set forth in my prior application, hereinbefore referred to. As shown more particularly in Figs. 1 and 2, it consists of a cylinder 19, which is rotated in any suitable manner—as, for instance, that shown and which is set forth in my prior application. This cylinder is hollow and is provided with perforations 20, which are arranged in groups therein corresponding with the circular bands or rows of cutters on the cutting-cylinder 4. For instance, the particular cylinder 19 (shown in Fig. 2 of the drawings) is arranged to coöperate with the cutting-cylinder shown in Fig. 3, there being five groups of apertures corresponding with the five circular bands of cutters on the cutting-cylinder, and there being blank spaces 21 separating the groups of perforations and corresponding with the circular portions of the cutting-cylinder in which the apertures 11 lie. Within the cylinder 19 is located a fixed hollow cylinder 22, connected by means of a pipe 23 with a fan, pump, or other means for exhausting the air therefrom. The cylinder 22 is provided with a slot 24 or similar opening, as in my application hereinbefore referred to, and this slot is so located as to exhaust the air through the apertures 20 at that point where the crackers are to be stripped from the cutting-cylinder. It will be observed that the air-suction device not only strips the cut crackers from the cutting-cylinder, but also carries them away therefrom, as in my prior application, and it will also be observed that the location of the apertures of the exhaust-cylinder is such that while the cut crackers are properly stripped from the imperforate portions of the cutting-cylinder the suction has no effect upon the intervening pieces of scrap which come opposite the blank portions of the suction-cylinder and are, therefore not affected by the suction, but are forced by the succeeding portions of dough into the interior of the cutting-cylinder.

The machine may be provided with a plate 25 between the belt 1 and the cylinder 19 and with a scraping-plate 26 for the cylinder 19, as well as an off-carrying belt 27, passing around rollers 28 and 29 and serving to deliver the cut crackers from the machine.

The general operation of the machine will be readily understood without further description, and it will be seen that by the construction which I have devised the machine set forth in my prior application is adapted for use not only in the cutting of rectangular crackers, in which operation no scrap is formed, but also for the cutting of other forms of crackers and biscuit, by reason of the provision made for the handling of the scrap or waste without affecting the operativeness of the mechanism.

While I have described a particular embodiment of my invention, yet I do not wish to be understood as limiting myself to the particular details of construction hereinbefore set forth. It is, moreover, obvious that while my particular construction is specially adapted for use in conjunction with an air-suction stripping device such as is set forth herein, yet it may be used in conjunction with other stripping mechanism.

I claim—

1. In a cracker or biscuit machine, a hollow rotary cutting-cylinder provided on its exterior with cutters to form the crackers or biscuit from the sheet of dough and having apertures between the cutters through which the scrap may pass into the interior of the cylinder, substantially as described.

2. In a cracker or biscuit machine, a hollow rotary cutting-cylinder provided on its exterior with cutters to form the crackers or biscuit from the sheet of dough and having apertures of inwardly-increasing diameter between the cutters through which the scrap may pass into the cylinder, substantially as described.

3. In a cracker or biscuit machine, a hollow rotary cutting-cylinder open at one end, provided on its exterior with cutters to form the crackers or biscuit from the sheet of dough, and having apertures between the cutters through which the scrap may pass into the interior of the cylinder, in combination with means for feeding the scrap along the interior of the cylinder and discharging it from the open end thereof, substantially as described.

4. In a cracker or biscuit machine, the combination, with a hollow rotary cutting-cylinder, open at one end and provided with apertures through which the scrap may pass into the interior thereof, of a spiral conveyer located within the cutting-cylinder and adapted to feed the scrap to and through the open end thereof, substantially as described.

5. In a cracker or biscuit machine, the combination, with a hollow rotary cutting-cylinder open at one end and having apertures through which the scrap may pass into the interior thereof, of a fixed spiral conveyer located within said cylinder and extending longitudinally thereof to the open end, substantially as described.

6. In a cracker or biscuit machine of the character described, the combination, with a hollow rotary cutting-cylinder having apertures between the cutters through which the scrap may pass into the interior of the cylinder, of a revolving air-suction device for stripping and conveying away the cut crackers or biscuit from the cutting-cylinder, said device being constructed and arranged to operate only upon those portions of the cylinder lying within the cutters, whereby the discharge of the scrap through the apertures of the cutting-cylinder is not affected, substantially as described.

7. In a cracker or biscuit machine of the character described, the combination, with a hollow rotary cutting-cylinder having apertures between the cutters through which the scrap may pass into the interior of the cylinder, said apertures being circularly arranged around the cylinder, of an air-suction device for stripping and conveying the cut crackers or biscuit from the cutting-cylinder, comprising a revolving cylinder perforated except as to those parts which coincide with the scrap-apertures, and means for exhausting the air from the interior thereof, substantially as described.

FRANK M. PETERS.

Witnesses:
IRVINE MILLER,
ADA H. BARNES.